US011150419B2

(12) United States Patent
Tovey

(10) Patent No.: US 11,150,419 B2
(45) Date of Patent: Oct. 19, 2021

(54) METHOD OF PROCESSING A FERRULE AND APPARATUS FOR CARRYING OUT THE METHOD

(71) Applicant: CORNING RESEARCH & DEVELOPMENT CORPORATION, Corning, NY (US)

(72) Inventor: Cameron John Tovey, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/451,463

(22) Filed: Jun. 25, 2019

(65) Prior Publication Data

US 2020/0003962 A1 Jan. 2, 2020

Related U.S. Application Data

(60) Provisional application No. 62/692,642, filed on Jun. 29, 2018.

(51) Int. Cl.
*G02B 6/38* (2006.01)
*B24B 19/22* (2006.01)

(52) U.S. Cl.
CPC .......... *G02B 6/3863* (2013.01); *B24B 19/226* (2013.01)

(58) Field of Classification Search
CPC ...... G02B 6/3863; G02B 6/381; G02B 6/385; G02B 6/3874; G02B 6/3882; B24B 19/226; B24B 47/10; B24B 47/16
USPC ................ 385/78–85, 136–139; 451/41, 271
See application file for complete search history.

(56) References Cited

U.S. PATENT DOCUMENTS

| 4,291,502 | A | 9/1981 | Grimsby et al. |
| 5,136,820 | A | 8/1992 | Luther |
| 5,432,880 | A | 7/1995 | Diner |
| 5,480,344 | A | 1/1996 | Xu et al. |
| 5,683,290 | A | 11/1997 | Kanda et al. |
| 5,947,797 | A | 9/1999 | Buzzetti |
| 6,183,343 | B1 | 2/2001 | Buzzetti |
| 6,190,239 | B1 | 2/2001 | Buzzetti |
| 6,428,391 | B2 | 8/2002 | Buzzetti |
| 6,454,631 | B1 | 9/2002 | Buzzetti |
| 7,217,174 | B1* | 5/2007 | Medeiros ............. B24B 19/226 451/271 |
| 2004/0152399 | A1* | 8/2004 | Bianchi ................ B24B 19/226 451/41 |
| 2005/0069256 | A1 | 3/2005 | Jennings et al. |
| 2017/0100816 | A1 | 4/2017 | Wang et al. |

OTHER PUBLICATIONS

International Search Report and Written Opinion of the European International Searching Authority; PCT/US2019/039400; dated Oct. 9, 2019, 10 Pgs.

* cited by examiner

*Primary Examiner* — Michael P Mooney
(74) *Attorney, Agent, or Firm* — Kapil U. Banakar

(57) ABSTRACT

A method of processing at least one ferrule is disclosed. The at least one ferrule includes an end face. The method includes engaging the end face of the at least one ferrule and an abrasive element with each other at the mating interface; moving the at least one ferrule and the abrasive element relative to each other; and tracing a spiral path in the abrasive element due to the relative movement between the at least one ferrule and the abrasive element. An apparatus for carrying out the method is also disclosed.

24 Claims, 10 Drawing Sheets

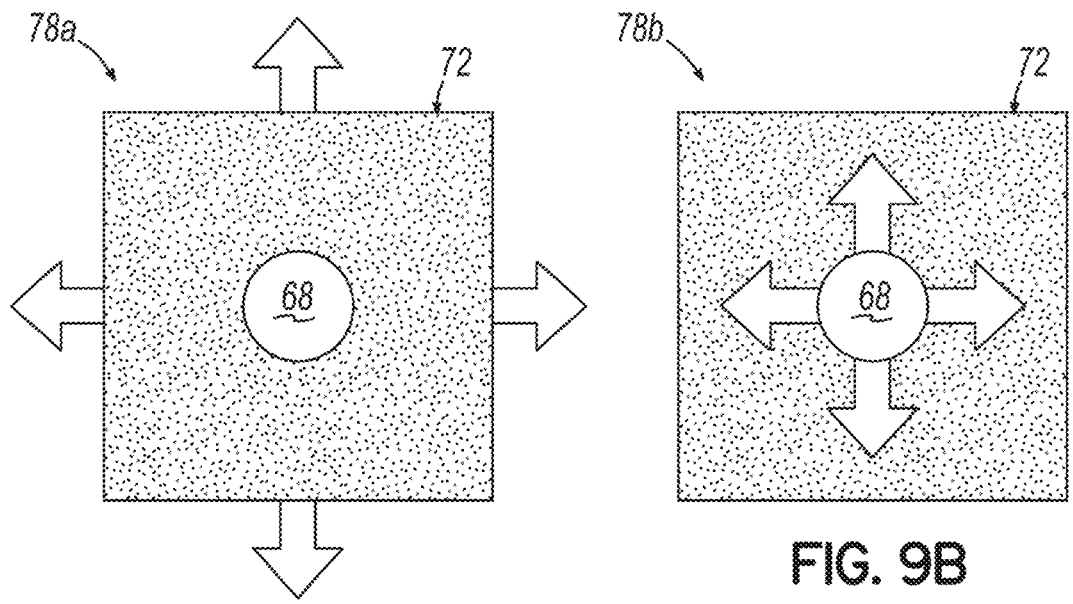
FIG. 9A
FIG. 9B
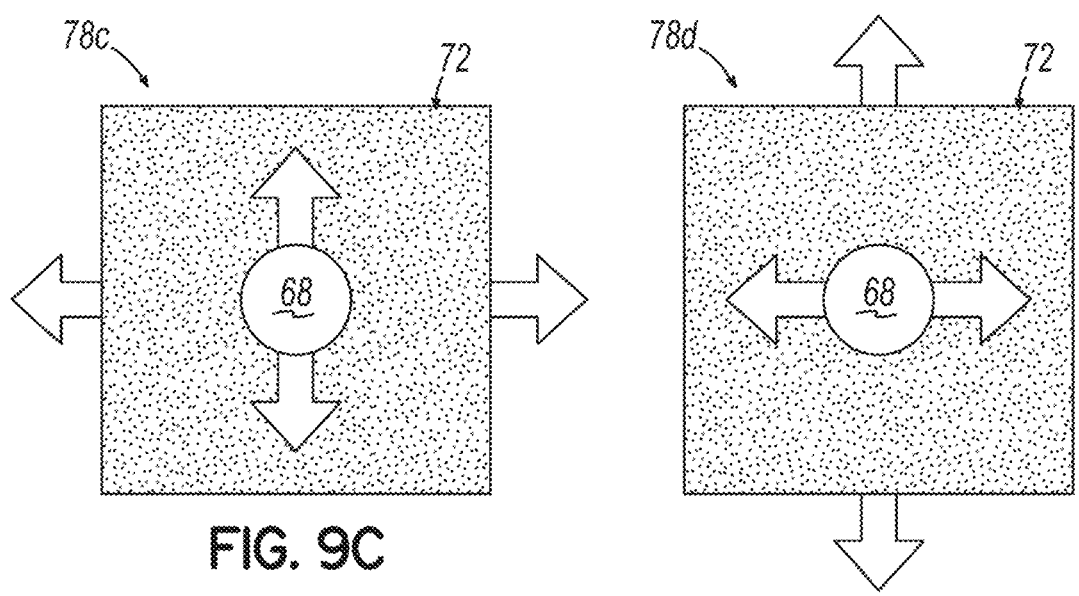
FIG. 9C
FIG. 9D

METHOD OF PROCESSING A FERRULE AND APPARATUS FOR CARRYING OUT THE METHOD

PRIORITY APPLICATION

This application claims the benefit of priority of U.S. Provisional Application No. 62/692,642, filed on Jun. 29, 2018, the content of which is relied upon and incorporated herein by reference in its entirety.

TECHNICAL FIELD

This disclosure relates generally to optical connectivity, and more particularly to a method of processing ferrules for optical fiber applications and an apparatus for carrying out the method.

BACKGROUND

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), an optical fiber in the ferrule is positioned in a known, fixed location relative to the housing. This allows an optical connection to be established when the optical fiber is aligned with another optical fiber provided in the mating connector.

The assembly of connectors involve several steps, including the end preparation of the optical fibers to be connectorized. In general, end preparation involves four main processing steps: (1) stripping the polymer coating to expose a select length of the bare glass fiber; (2) precision cleaving the base glass fiber section with controlled end angles and surface quality; (3) inserting the optical fiber in a ferrule of the connector to have a controlled protrusion distance from the ferrule; and (4) polishing the end of the optical fiber that protrudes from the ferrule. The precision cleaving step may take place before or after inserting the optical fiber in the ferrule. The polishing step aids in removing certain defects from the end face of the optical fiber as well as the end face of the ferrule, such as scratches, pits, digs, as well as adhesives and contaminates, to provide a clean, well-defined mating interface.

The fiber and ferrule end faces are generally flush with each other and in many cases the ferrule end face has a domed geometry with the dome apex intended to be at the center of the optical fiber. Such domed geometry is often referred to as a "physical contact" geometry, and it may be a result of polishing the end face of the ferrule prior to inserting the optical fiber, polishing fiber and ferrule end faces together (e.g., after inserting the optical fiber into the ferrule and securing it relative to the ferrule), or some combination of these approaches. The ferrule, for example, may be polished from every direction equally so that the end face of the ferrule generally has the domed geometry before inserting the optical fiber.

Regardless of the approach, it is important that the polishing step of the connectorization process maintains/achieves the desired precise geometry of the ferrule/fiber end faces. Indeed, in many cases, the fiber and ferrule end faces must conform to relevant industry standards that specify requirements for apex offset (AO), radius of curvature (ROC), and fiber height for different physical contact geometries. Examples of physical contact geometries known in the industry include, but are not limited to, physical contact (PC), angled physical contact (APC), and ultra physical contact (UPC) geometries. Thus, the challenge is to polish down the protrusion of the optical fiber from the ferrule end face to an acceptable height (e.g., within 50 microns of the ferrule end face) and to polish out defects in the optical fiber and ferrule in a manner that does not alter the end face geometries (e.g., the radius of curvature in the case of a domed end face) or the position of the apex. In conventional approaches, this is achieved by engaging the ferrule/fiber end faces with an abrasive element, which may take the form of an abrasive sheet or film, or an abrasive slurry. In order to maintain the end face geometry during the polishing step, it is desirable to polish the ferrule/fiber end faces equally from every direction.

Several approaches have been developed to ensure that polishing occurs equally from every direction. These approaches typically include moving the ferrule/fiber assembly relative to the abrasive element in a certain pattern. By way of example, and as illustrated in FIG. 1A, a circular pattern is often used to polish the ferrule/fiber end faces. Thus, for example, if the abrasive element is fixed in position and the ferrule/fiber assembly is moved along a circular path, then the direction of polish, which is tangent to the circular motion, goes through every direction equally and the geometry of the ferrule/fiber end faces is maintained. FIG. 1B illustrates another known approach in which a figure-8 polishing pattern is used to polish the ferrule/fiber end faces equally from every direction and thereby maintain precise end face geometry.

During the polishing process, the abrasive particles used on the abrasive element becomes dislodged from its surface while glass and ceramic (e.g., the material of the optical fiber and the ferrule) become deposited on the abrasive element. Thus, after some use of the circular path the abrasive element becomes worn and using the same circular path on subsequent ferrule/fiber assemblies may impact the quality of the polishing step and introduce unwanted geometric variations. Accordingly, new abrasive elements may have to be introduced for subsequent assemblies. The abrasive elements, including commercially available abrasive sheets or films, are expensive and the efficient use of the abrasive elements is desired in order to reduce processing costs.

One prior attempt to resolve this issue include introducing an axis of motion to move the center of the circular trace path in a specified direction. The result of such movement is illustrated in FIG. 1C, which shows the translation of the circular path along a translational axis. While such solutions provide improved usage of the abrasive element, the translational movement produces non-uniformities in the trace patterns on the abrasive element. For example, region A represents a region of under-usage of the abrasive element, as there are significant areas of the abrasive surface that are not even used at all. Region B, however, represents a region of over-usage of the abrasive element, where the trace paths cross each other multiple times, leading to wear and uneven material removal during the polishing process. This non-uniformity can lead to undesired changes to the end face geometries of the ferrule and optical fiber, as well as undesirable defects like scratches, etc. FIG. 1D illustrates a similar configuration, but for the translation of the FIG. 8 pattern along a translational axis. Similar to the above, this produces regions of under-usage and regions of over-usage of the abrasive element. The overused regions B may produce unwanted variations in the ferrule/fiber end face geometries.

Accordingly, manufacturers continue to strive for an improved method of polishing the end faces of connectors, and more particularly the end faces of ferrule/fiber assemblies, in a manner that maintains end face geometries by polishing equally from every direction while at the same time providing an efficient uniform use of the abrasive element that avoids variations and inconsistencies in polish quality.

SUMMARY

To address these and other shortcomings, a method of processing at least one ferrule that includes an end face is disclosed. The method includes engaging the end face of the at least one ferrule and an abrasive element with each other; moving the at least one ferrule and the abrasive element relative to each other; and tracing a spiral path in the abrasive element due to the relative movement between the at least one ferrule and the abrasive element.

In some embodiments, each ferrule may be part of a respective ferrule assembly that also includes at least one optical fiber. In other words, in some embodiments at least one ferrule assembly comprises the at least one ferrule referred to in the preceding paragraph and at least one optical fiber coupled to the at least one ferrule. Thus, in such embodiment, the engaging, moving, and tracing steps may be performed with the at least one ferrule assembly. For example, the end face of the at least one ferrule and an end of the at least one optical fiber may define a mating interface of the corresponding ferrule assembly. The engaging step then comprise engaging the at least one ferrule assembly and the abrasive element with each other at the mating interface.

In one embodiment, moving the at least one ferrule and abrasive element relative to each other includes holding the at least one ferrule stationary and moving the abrasive element relative to the at least one ferrule to trace the spiral path in the abrasive element. In another embodiment, moving the at least one ferrule and abrasive element relative to each other includes holding the abrasive element stationary and moving the at least one ferrule relative to the abrasive element to trace the spiral path in the abrasive element. In yet a further embodiment, moving the at least one ferrule and abrasive element relative to each other includes moving both the at least one ferrule and the abrasive element to trace the spiral path in the abrasive element.

In an exemplary embodiment, tracing the spiral path in the abrasive element includes tracing the spiral path of an Archimedean spiral, wherein successive passes of the spiral path are separated from each other by a substantially constant distance. In one embodiment, tracing the spiral path in the abrasive element includes tracing the spiral path such that successive passes of the spiral path provide a gap therebetween. By way of example, the gap may have a radial width that is less than 15% of a radial width of the successive passes of the spiral path. In another embodiment, tracing the spiral path in the abrasive element includes tracing the spiral path such that successive passes of the spiral path overlap each other to define a radial overlap region. In one embodiment, a radial width of the radial overlap region may be less than 50% of a radial width of the successive passes of the spiral path.

In an exemplary embodiment, tracing the spiral path includes tracing a first spiral path in the abrasive element from the processing the at least one ferrule, wherein the first spiral path is defined in a first ring region on the abrasive element, and tracing a second spiral path in the abrasive element from the processing at the at least one ferrule, wherein the second spiral path is defined in a second ring region on the abrasive element. In one embodiment, the at least one ferrule includes a first ferrule and a second ferrule and the method includes performing the engaging, moving, and tracing with the first ferrule to trace the first spiral path, and performing the engaging, moving, and tracing with the second ferrule to trace the second spiral path. In another embodiment, the at least one ferrule includes a first ferrule and the first spiral path represents a first processing step of the first ferrule and the second spiral path represents a second processing step of the first ferrule. In one embodiment, the tracing of the first and second spiral paths may be carried out in parallel. In an alternative embodiment, the tracing of the first and second spiral paths may be carried out in series. In one embodiment, the second ring region may be separated from the first ring region so that there is no overlap therebetween. In a further embodiment, the second ring region may be generally disposed about the first ring region and may be separated from the first ring region to define a radial gap therebetween. In another embodiment, tracing the second spiral path further includes overlapping the first spiral path to define a longitudinal overlap region of the first and second spiral paths. The first and second spiral paths may overlap for no more than about 50% of the distance of the second spiral path.

In one embodiment, the at least one ferrule and the abrasive element may be moved relative to each other so that the spiral path is traced at a substantially constant speed. In another embodiment, the at least one ferrule and the abrasive element may be moved relative to each other so that the spiral path is traced at a substantially constant acceleration. In yet a further embodiment, the spiral path may include a first spiral path portion and a second spiral path portion, wherein the first spiral path portion is traced by moving the at least one ferrule and the abrasive element relative to each other at a substantially constant acceleration, and wherein the second spiral path portion is traced by moving the at least one ferrule and the abrasive element relative to each other at a substantially constant velocity. In one embodiment, tracing the spiral path in the abrasive element further includes tracing the spiral path from a radially inward position toward a radially outward position. Alternatively, and in another embodiment, tracing the spiral path in the abrasive element further includes tracing the spiral path from a radially outward position toward a radially inward position.

An apparatus for processing at least one ferrule with an abrasive element includes a first mount and a second mount. The at least one ferrule is configured to be secured to one of the first or second mounts and the abrasive element is configured to be secured to the other of the first or second mounts. At least one of the first and second mounts is movable. The apparatus further includes a controller operatively coupled to the at least one of the first and second mounts is movable that is movable. The controller is configured to cause relative movement between the first and second mounts such that engagement of the at least one ferrule and the abrasive element traces a spiral pattern in the abrasive element.

In one embodiment, the first mount is stationary and the second mount is movable by the controller. The at least one ferrule is configured to be secured to the first mount and the abrasive element is configured to be secured to the second mount. Alternatively, the abrasive element may be configured to be secured to the first mount and the at least one ferrule may be configured to be secured to the second mount. In this embodiment, the second mount may include a multi-axis frame capable of moving in at least two directions. In an alternative embodiment, each of the first and second mounts may be movable by the controller. In this alternative embodiment, the first mount may include a frame capable of moving in at least one direction and the second mount may include a frame capable of moving in at least one direction, wherein collectively the first and second mounts are movable by the controller so as to trace the spiral path in the abrasive element. In one embodiment, the apparatus may include a mounting plate capable of holding a plurality of ferrules. In this way, a batch of ferrules may be processed together.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 9A-9D are schematic illustrations of possible relative movements between the ferrule assembly and the abrasive element to trace the spiral path in the abrasive element;

DETAILED DESCRIPTION

Figure 2:
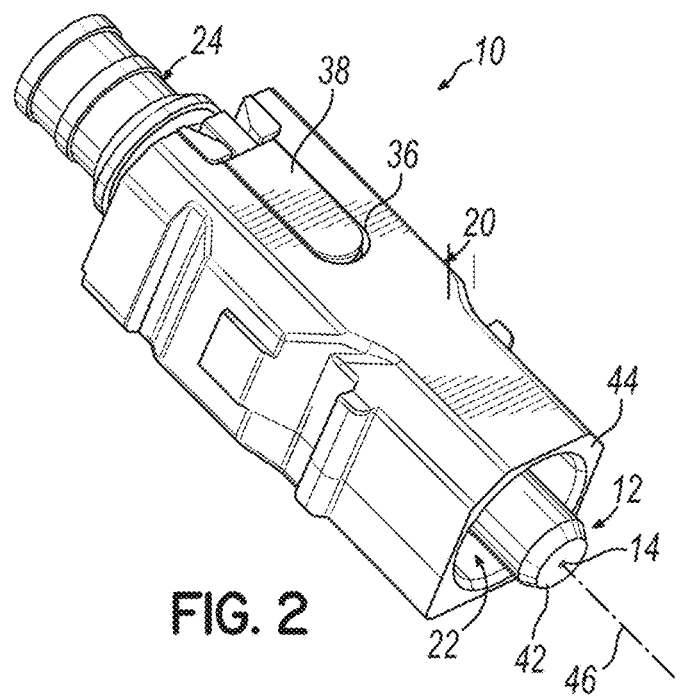
FIG. 2 is a perspective view of a fiber optic connector.

Various embodiments will be further clarified by examples in the description below. In general, the description relates to processing ferrules, such as those used in fiber optic connectors and fiber optic cable assemblies including the same. One example of a fiber optic connector 10 (also referred to as "optical connector 10", or simply "connector 10") is shown in FIG. 2. Although the connector 10 is shown in the form of a SC-type connector, the features described below may be applicable to different connector designs. This includes ST, LC, and MU-type connectors, for example, and other single-fiber or multi-fiber connector designs.

Figure 3:
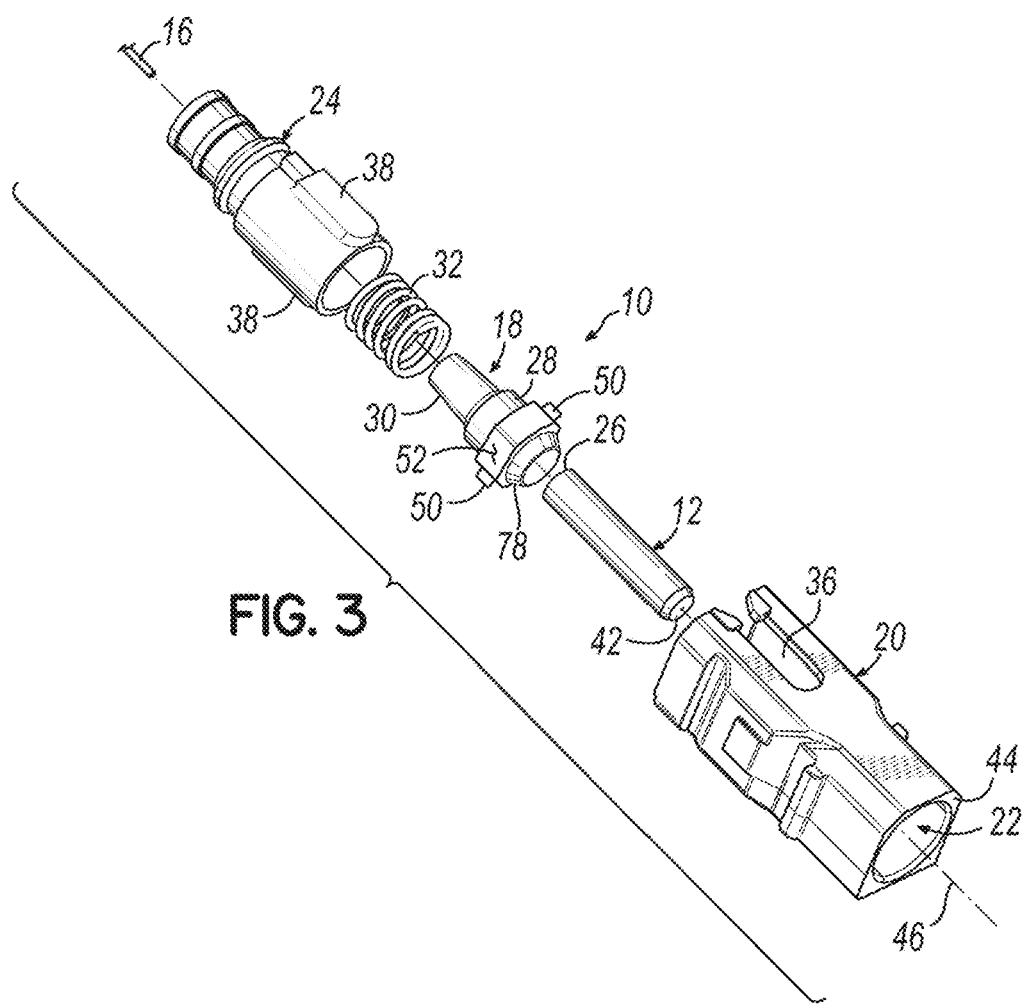
FIG. 3 is an exploded perspective view of the fiber optic connector shown in FIG. 2.

As shown in FIGS. 2 and 3, the connector 10 includes a ferrule 12 having a ferrule bore 14 ("micro-hole") configured to support an optical fiber 16, a ferrule holder 18 from which the ferrule 12 extends, a housing 20 having a cavity 22 in which the ferrule holder 18 is received, and a connector body 24 (also referred to as "inner housing 24", "retention body 24", or "crimp body 24") configured to retain the ferrule holder 18 within the housing 20. More specifically, a back end 26 of the ferrule 12 is received in a first portion 28 of the ferrule holder 18 and is secured therein in a known manner (e.g., press-fit, adhesive, molding the ferrule holder 18 over the back end 26 of the ferrule 12, etc.). The ferrule 12 and ferrule holder 18 may even be a monolithic structure in some embodiments.

The ferrule holder 18 is biased to a forward position within the housing 20 by a spring 32, which extends over a second portion 30 of the ferrule holder 18 that has a reduced cross-sectional diameter/width compared to the first portion 28. The spring 32 also interacts with internal geometry of the connector body 24, which may be secured to the housing 20 using a snap-fit or the like. For example, FIGS. 2 and 3 illustrate a rear portion of the housing 20 having cut-outs or slots 36 on opposite sides so as to define a split shroud. The connector body 24 has tabs 38 configured to be snapped into the slots 36 and retained therein due to the geometries of the components.

Figure 4:
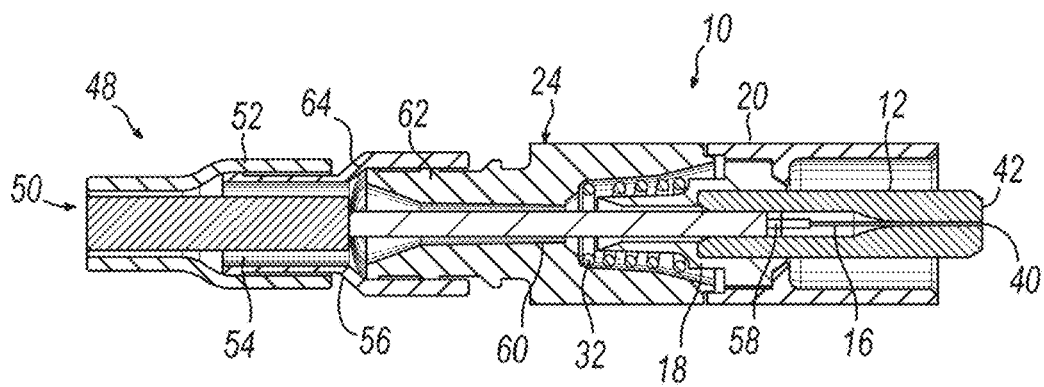
FIG. 4 is a cross-sectional view of the fiber optic connector of FIG. 2 installed on a fiber optic cable.

When the connector 10 is assembled as shown in FIG. 2, a front end 42 of the ferrule 12 ("ferrule end face 42") projects beyond a front end 44 of the housing 20. The ferrule end face 42 presents the optical fiber 16 ("fiber end 40") for optical coupling with a mating component (e.g., another fiber optic connector; not shown). Note that the ferrule 12 aligns the optical fiber 16 along a longitudinal axis 46. These aspects can be better appreciated with reference to FIG. 4, which shows how a fiber optic cable 50 (hereinafter "cable 50") including the optical fiber 16 can be terminated with the connector 10. In other words, the connector 10 can be installed on the cable 50 to form a fiber optic cable assembly 48. The cable 50 is merely an example to facilitate discussion. In the embodiment shown, the fiber cable 50 includes an outer jacket 52, inner jacket 54, strength members 56 in the form of aramid yarn, and the optical fiber 16, which itself has a coating 58 and a buffer layer 60 ("tight buffer"). Portions of the outer jacket 52 and inner jacket 54 have been removed from the optical fiber 16 to expose the strength members 56, which are cut to a desired length and placed over a rear portion 62 of the connector body 24. The strength members 56 are coupled to the connector body 24 by a crimp band 64 (also referred to as "crimp ring") that has been positioned over the optical fiber 16 and a portion of the strength members 56 and inner jacket 54. Again, the cable 50 is merely an example, as persons skilled in optical connectivity will appreciate how different cable designs may be terminated with the connector 10.

Figure 5A:
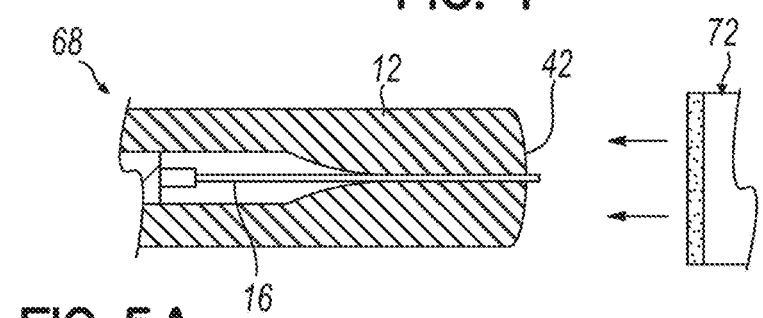
FIGS. 5A and 5B schematically illustrate a ferrule and optical fiber coupled together and being polished by an abrasive element at a mating interface.
Figure 5B:
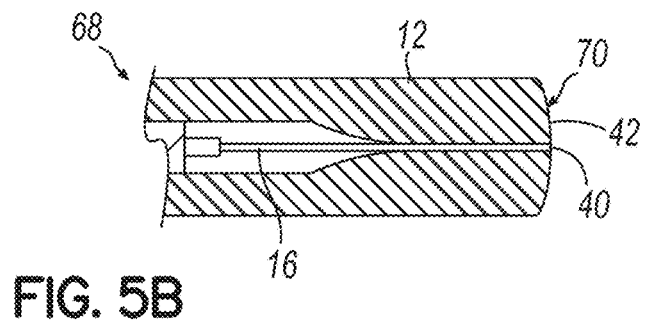

During the formation of the connector 10, the optical fiber 16 may be coupled to the ferrule 12 (e.g., secured to the ferrule bore 14 using an adhesive) in the connectorization process to provide a ferrule assembly 68. As used herein and illustrated in FIGS. 5A and 5B, a ferrule assembly 68 includes the ferrule 12 and the optical fiber 16 coupled together. The ferrule end face 42 and a front end of the optical fiber 16 ("fiber end 40") together define a mating interface 70 ("interface 70"). In one embodiment, the mating interface 70 may be generally domed shaped with the optical fiber 16 positioned at or substantially at (i.e., within 50 microns of) the apex of the dome. Other geometries, however, may also be possible. During the connectorization process the optical fiber 16 may have a small protrusion that extends beyond the ferrule end face 42 (FIG. 5A). The interface 70 is then polished to remove the protrusion so that the fiber end 40 is substantially flush with (i.e., within 50 microns of) the ferrule end face 42 (FIG. 5B). Additionally, polishing also helps remove defects that may exist on the interface 70.

As discussed above, during this processing step of the end face 70, it is important that the geometry of the interface 70 of the ferrule assembly 68 be maintained or achieved (e.g., domed shape with the optical fiber at the apex of the dome). From a broad perspective, one aspect of the present disclosure is directed to an improved method of processing the ferrule 12 to provide a desired geometry. The ferrule 12 may be processed prior to inserting and securing the optical fiber 16, after inserting and securing optical fiber 16 (such that the processing is of the ferrule assembly 68), or by combination of these approaches. In some embodiments where the ferrule assembly 68 is processed, the processing may even occur when the ferrule assembly 68 is supported by the connector body 12 (and thereby assembled as part of the connector 10).

For convenience, the description below will refer to processing the ferrule assembly 68. It will be appreciated, however, that the same processing may be performed with respect to the ferrule 12 without the optical fiber 16. Regardless of the approach, the ferrule 12 is processed in a manner that provides engagement between the ferrule end face 42 (or interface 70 for ferrule assembly 68) and an abrasive element 72 substantially equally from every direction (e.g., to maintain/achieve geometry) and utilizes the abrasive element 72 in an efficient manner (e.g., to reduce costs).

Figure 6:
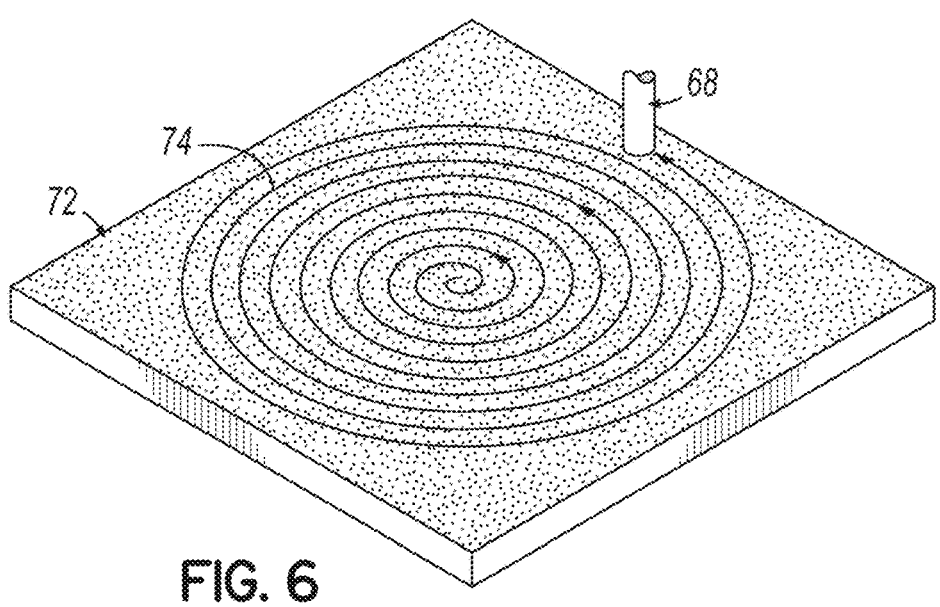
FIG. 6 is a perspective view of a trace pattern on an abrasive element in accordance with an embodiment of the disclosure.

For example, as illustrated in FIG. 6, these goals may be achieved by moving the ferrule assembly 68 and abrasive element 72 relative to each other so as to trace a spiral path 74 in the abrasive element 72. As explained in more detail below, the relative movement between the ferrule assembly 68 and the abrasive element 72 may be achieved by maintaining the abrasive element 72 in a fixed position and moving only the ferrule assembly 68, maintaining the ferrule assembly 68 in a fixed position and moving only the abrasive element 72, or moving both the ferrule assembly 68 and the abrasive element 72 in such a manner as to trace the spiral path 74 in the abrasive element 72. In any event, one revolution along the spiral path 74 defines a pass of the spiral and effectively produces a direction of engagement (e.g., an abrading direction) between the interface 70 and the abrasive element 72 from every circumferential direction (e.g., each angle in the full 360°). Additional revolutions around the spiral path 74 (i.e., passes) repeat the processing of the interface 70. In this way, due to the interaction between the interface 70 and the abrasive element 72, material may be removed from the interface 70 in a substantially symmetric fashion such that the geometry of the interface 70 and the relative position of the optical fiber 16 at the interface 70 are maintained.

Figure 1A:
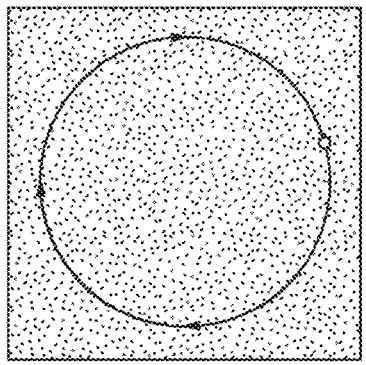
FIGS. 1A-1D are schematic views illustrating trace patterns on an abrasive element resulting from prior art polishing techniques.
Figure 1B:
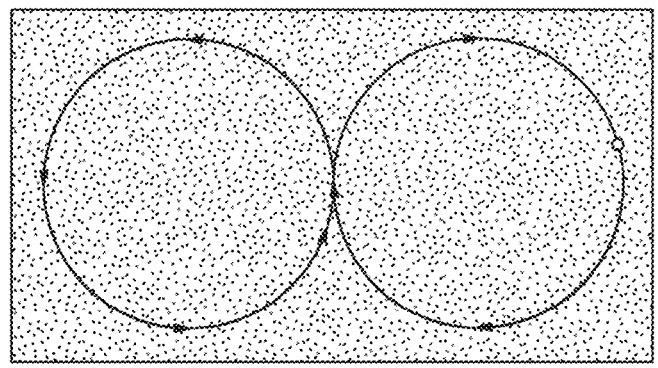
Figure 1C:
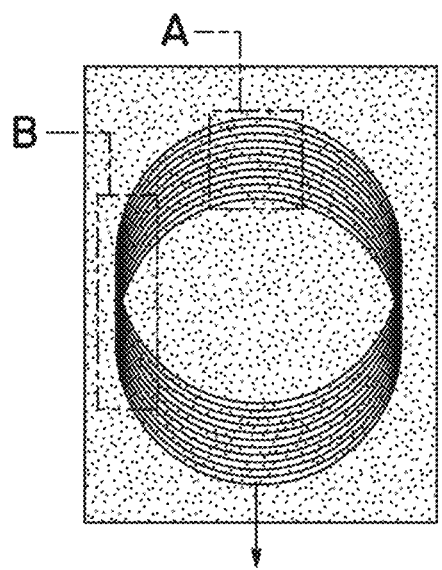
Figure 1D:
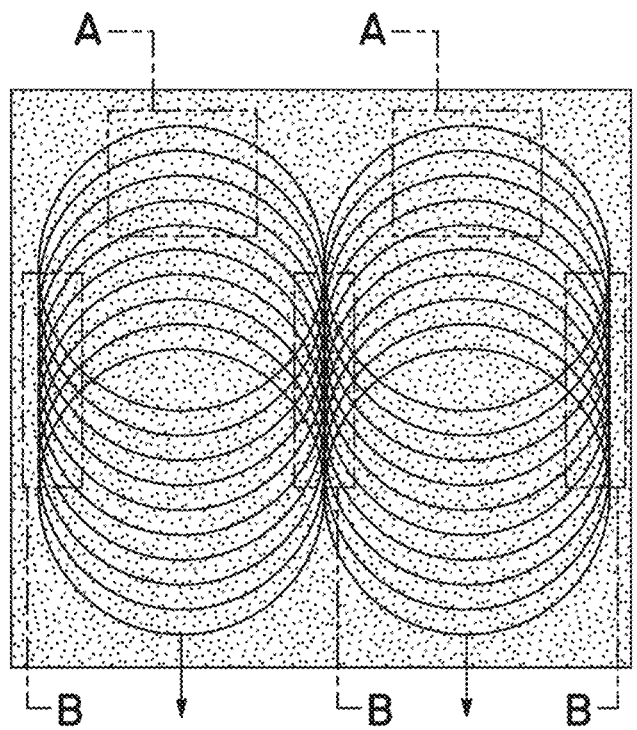

Additionally, the spiral path 74 utilizes the area of the abrasive element 72 in a very efficient manner. While the spacing between successive passes of the spiral path 74 in FIG. 6 have been exaggerated for purposes of illustration, the distance between successive passes of the spiral path 74 may be quite small such that there is relatively little void space (area over which the interface 70 has not passed over) on the abrasive element 72. By way of example, =the percentage of the spiral area (i.e., the area between the outermost pass and the innermost pass) that may be unused may be less than 10%, less than 5%, or even less than 2% in some embodiments. Thus, efficient usage of the abrasive element 72 may be achieved by using the spiral path 74. Furthermore, it is noteworthy that the spiral path 74 does not cross itself at various points or regions. This is in contrast to FIGS. 1C and 1D, for example, where usage of the abrasive element can be highly non-uniform. Accordingly, by providing a spiral path 74 that does not cross itself, variations that might result from passing the interface 70 over regions of the abrasive element 72 that were previously used may be avoided and more consistent output may be achieved.

While different types of spirals may be used, in an exemplary embodiment, the spiral that is traced in the abrasive element 72 may be an Archimedean spiral, wherein successive passes of the spiral path 74 are separated by a substantially constant distance. The use of an Archimedean spiral makes use of the abrasive element 72 in a predictable and uniform manner that is conducive to automated manufacturing. The equation of an Archimedean spiral is given by:

$$r(\theta) = R_0 + \frac{U}{2\pi}\theta, \tag{1}$$

where $R_0$ is the initial radius and U is the radial feed rate in radial distance per revolution or radians. The magnitude of U essentially determines the distance between successive passes of the spiral path 74 and dictates how tight or loose the spiral path 74 is wound. If U is greater than zero, then the spiral path traverses from a radially inward position to a radially outward position, and if U is less than zero, then the spiral path traverses from a radially outward position to a radially inward position. Aspects of this disclosure may be achieved with U either positive or negative so long as the path that is traced in the abrasive element is a spiral path.

According to Preston's equation, the distance the ferrule assembly 68 and abrasive element 72 are engaged in relative movement is the primary driver for the removal of material from the interface 70. Accordingly, it may be instructive to know the distance traveled along the spiral path from an initial position of $R_0$ to some arbitrary radial position r along the spiral path. A common equation for length along a curve in polar coordinates is provided by:

$$d(r) = \frac{1}{U} \int_{R_0}^{r} \sqrt{r^2 + \left(\frac{dr}{d\theta}\right)^2} \, d\theta. \tag{2}$$

From equation (1) above, $$\frac{dr}{d\theta} = \frac{U}{2\pi}, \, d\theta = \frac{2\pi}{U} dr. \tag{3}$$

Then substituting equations (3) into equation (2), one obtains:

$$d(r) = \frac{1}{U} \int_{R_0}^{r} \sqrt{(2\pi r)^2 + U^2} \, dr. \tag{4}$$

Because distance is the primary driver for material removal from Preston's equation, from a processing standpoint, it may be desirable to specify the total distance of abrasive engagement D between the ferrule assembly 68 and the abrasive element 72. The distance D may, for example, be independently determined in order to remove the protrusion of the optical fiber 16 and remove material from the interface 70 sufficient to clean the interface 70 and remove potential defects at the interface 70. Accordingly, D may be an input parameter in the process. In any event, with D specified, the question then becomes what value of r corresponds to this distance D along the spiral path 74. This value will be specified as $R_1$ and represents the end point of the spiral path 74. Given D, equation (4) could be numerically integrated, such as by a Newton-Raphson method, to determine the value of $R_1$ along the spiral path 74 that corresponds to a distance D.

According to the present disclosure, however, this may not be necessary. In this regard, and examining equation (4) above, it should be clear that the first term of the radicand corresponds to the circumference of a circle having radius r and the second term of the radicand corresponds to the feed rate U. Since it is desirable to use the abrasive element 72 in as efficient manner as possible, the value of U may be typically small. Accordingly, for r sufficiently away from the center of the spiral, the first term of the radicand is much larger than the second term (i.e., U<<$2\pi r$) and the radicand may be approximated as only the first term. Using this approximation, equation (4) reduces to:

$$d(r) = \frac{\pi}{U}(r^2 - R_0^2). \tag{5}$$

From a physical point of view, this indicates that the distance along the spiral d multiplied by the feed rate U is equal to the area of the ring that bounds the spiral path. In any event, this equation may be rearranged to solve for the radius along the spiral path as a function of distance:

$$r(d) = \sqrt{R_0^2 + \frac{Ud}{\pi}}. \tag{6}$$

Since d=D when r=$R_1$, equation (6) becomes:

$$R_1 = \sqrt{R_0^2 + \frac{UD}{\pi}}. \tag{7}$$

With $R_0$, U and D specified, (e.g., as input parameters to a processing system for example) the radial position along the spiral path 74 may be mathematically determined from equation (6), and the radial position $R_1$ at the end of the spiral path 74 may be mathematically determined from equation (7). Thus, in this example, the starting point $R_0$ of the spiral path 74, the ending point $R_1$ of the spiral path 74, the distance of abrading engagement D, and the feed rate U are all known or specified. As noted above, however, the determination of $R_1$ was based on an approximation (that the radial contribution was much smaller than the circumferential contribution). It should be realized that for each successive pass of the spiral path the error resulting from the approximation decreases and the overall error becomes negligible in the case of multiple passes along the spiral. For example, the error in the distance D for a spiral path having four passes is found to be around 0.7%. As the number of passes of the spiral path may be generally high in exemplary embodiments, the error resulting from the approximation is considered to be essentially negligible.

While many aspects of the polishing process have been addressed, one aspect of the process that has not yet been considered is how fast to move the ferrule assembly 68 relative to the abrasive element 72 along the spiral path 74. Note that speed is not part of the classic formulations for material removal according to Preston's equation, for example (i.e., material removal is not dependent on speed, but primarily distance). However, speed may have some second-order effects due to heat or hydroplaning, for example. Nevertheless, the speed of travel along the spiral path 74 is directly related to processing time, and it may be desirable to minimize the processing time so as to maximize throughput. Due to the potential for these second-order effects to increase and negatively impact processing of the interface 70, there may be a practical limit to the speed V at which the spiral path 74 may be traversed. In an exemplary embodiment, this limit in speed V may be determined independently and selected as an input parameter to the process. Additionally, the process may be configured so that the speed V may be held constant as the spiral path 74 is traversed. This ensures, for example, that processing time is minimized without negatively impacting the quality of the polishing occurring at the interface 70. For constant velocity, it is known that d(t)=V*t. This equation along with equation (6) can be used to provide the radial position along the spiral as a function of time:

$$r(t) = \sqrt{R_0^2 + \frac{UVt}{\pi}}. \tag{8}$$

Using this equation in combination with equation (1) provides the angular position θ along the spiral path as a function of time:

$$\theta(t) = \frac{2\pi}{U}(r - R_0). \tag{9}$$

The time variable has a range between [0, T], where r(T)=$R_1$. Equations (8) and (9) represent a system of equations that may be used to generate a spiral path in polar coordinates having the following characteristics: (i) a starting position of $R_0$; ii) an Archimedean spiral having a constant feed rate of U; iii) movement along the spiral path occurs at a constant speed of V; and iv) the spiral path ends at $R_1$ at which the total distance travelled along the spiral path is D.

Figure 8:
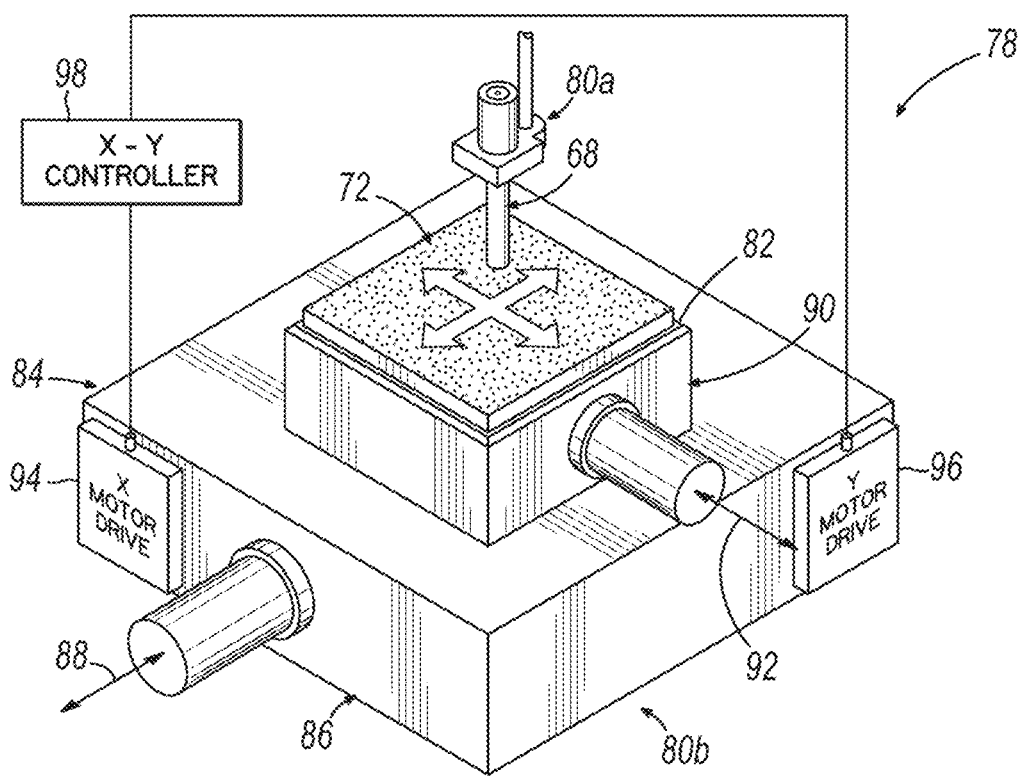
FIG. 8 is a schematic illustration of an apparatus for moving a ferrule assembly relative to an abrasive element to trace a spiral path on the abrasive element.

An apparatus 78 for generating the relative movement between the ferrule 12 and the abrasive element 72 to generate the spiral path 74 is schematically illustrated in FIG. 8. As mentioned above, the ferrule 12 may be processed by itself (i.e., before inserting and securing the optical fiber 16) and/or as part of the ferrule assembly 68 (i.e., after inserting and securing the optical fiber 16 in the ferrule 12). Thus, although the apparatus 78 will be explained with reference to processing the ferrule assembly 68, the disclosure below may apply equally to situations where the ferrule 12 is at least partially processed separately from the optical fiber 16.

In an exemplary embodiment, the apparatus 78 may be configured such that the ferrule assembly 68 is stationary while the abrasive element 72 is moved in an x-y plane to generate the spiral path 74. In this regard, the ferrule assembly 68 is secured to a first mount 80a and the abrasive element 72 is secured to a second mount 80b. The second mount 80b includes a holding plate 82 having an upper surface configured to receive the abrasive element 72, which may take the form of an abrasive sheet or film. The second mount 80b is configured to be movable. In this regard, the holding plate 82 may be mounted to a dual axis frame 84 having an x-stage 86 for moving the holding plate 82 in a direction defined by an x-axis 88 and a y-stage 90 for moving the holding plate 82 in a direction defined by a y-axis 92. The x-stage 86 includes a motor drive 94 for controlling an actuator (not shown) for moving the x-stage 86 along the x-axis 88 (i.e., in an x-direction). The y-stage 90 similarly includes a motor drive 96 for controlling an actuator for moving the y-stage 90 along the y-axis 92 (i.e., in a y-direction). The motor drives 94, 96 may be operatively coupled to a controller 98 for controlling the position of the abrasive element 72 relative to the ferrule assembly 68. The controller 98 may include a processor and a memory for storing data. Such apparatuses are generally known in the industry and a further description of the apparatus will not be provided herein.

The controller 98 may further include an input interface configured to receive input from a technician or the like, for example, for carrying out the processing (e.g., polishing) of the interface 70 of the ferrule assembly 68 by the apparatus 78. By way of example, the starting radius $R_0$, radial feed rate U, distance D, and speed V may all be input parameters input and stored in the controller 98. Using equations (8) and (9) above, the spiral path 74 may be specified in polar coordinates as a function of time. These coordinates may be converted to Cartesian coordinates through the well-known equations:

$$x = r \cos \theta; \text{ and}$$

$$y = r \sin \theta. \tag{10}$$

These Cartesian coordinates may be stored in memory or computed during operation by the processor. In any event, based on these Cartesian coordinates, the controller 98 may be configured to activate the motor drives 94, 96 to move the holding plate 92, and thus the abrasive element 72, to locations that correspond to the spiral path 74. While the apparatus 78 was described above as holding the ferrule assembly 68 stationary and moving the abrasive element 72 in a coordinated manner to generate the spiral path 74, other arrangements may be possible.

For example, in an alternative embodiment, the abrasive element 72 may be coupled to the first mount 80a and the ferrule assembly 68 may be coupled to the second mount 80b having dual-axis frame 84. The controller 98 may then be configured to generate the set of x-y points that correspond to the spiral path 74 similar to the operation described above. The controller 98 may also be configured to activate the motor drives 94, 96 to move the ferrule assembly 68 relative to the fixed abrasive element 72 so as to trace the spiral path 74 on the abrasive element 72. In another alternative embodiment, the mount 80a may include at least a single axis stage, e.g., either an x-stage or a y-stage, for moving the ferrule assembly 68 or the abrasive element 72 in one of the x or y-directions, and the second mount 80b may include at least a single axis stage, e.g., the other of the x-stage or y-stage, for moving the ferrule assembly 68 or the abrasive element 72 along the other of the x or y-directions. These various embodiments are schematically illustrated in FIGS. 9A-9D. FIG. 9A correspond to an apparatus 78a having the ferrule assembly 68 stationary while the abrasive element 72 is moved to produce the spiral path 74 in the abrasive element 72. FIG. 9B correspond to an apparatus 78b having the abrasive element 72 stationary while the ferrule assembly 68 is moved to produce the spiral path in the abrasive element 72. FIG. 9C corresponds to an apparatus 78c having the ferrule assembly 68 movable by an x-stage in the x-direction and the abrasive element 72 movable by a y-stage in the y-direction. FIG. 9D correspond to apparatus 78d having the ferrule assembly 68 movable by a y-stage in the y-direction and the abrasive element 72 movable by a x-stage in the x-direction.

In some embodiments, the apparatus 78 may be configured to process a plurality of ferrule assemblies 68 in a serial manner using a spiral path. Additionally, to reduce down time in the process, the abrasive element 72 may be sized so that multiple ferrule assemblies 68 may be processed on the abrasive element 72. From the discussion above, it should be understood that material removal is primarily dependent upon the distance D of abrading engagement between the interface 70 of the ferrule assembly 68 and the abrasive element 72. Thus, the radius and angles of the spiral path do not impact the quality of the operation and one can expect uniformity in output if the input parameters, such as D, U and V, remain the same for the plurality of ferrule assemblies 68.

Figure 10:
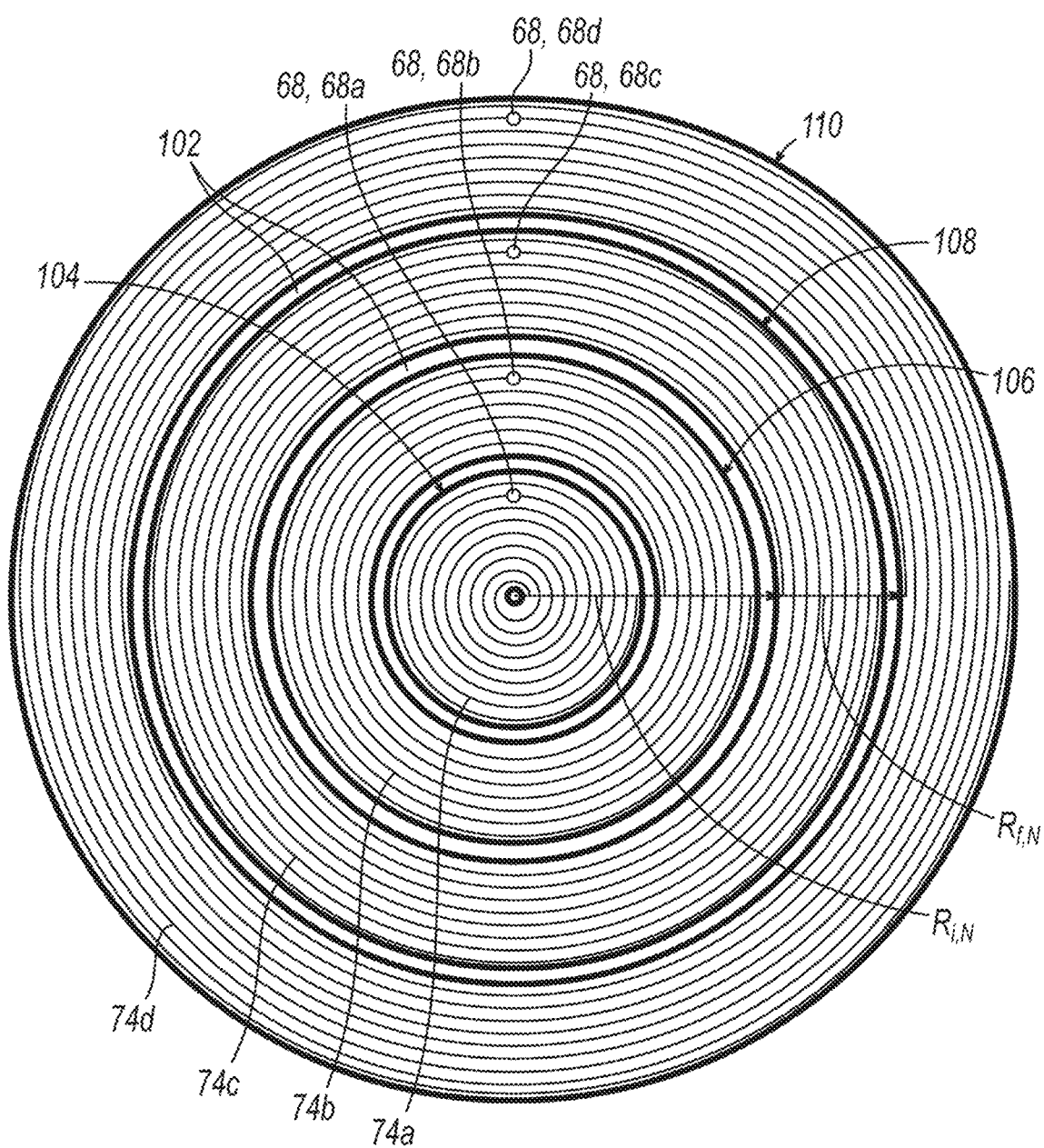
FIG. 10 is schematic illustration of spiral trace patterns in the form of concentric rings in accordance with an embodiment of the disclosure.

For example, in an exemplary embodiment, each of the ferrule assemblies 68 (e.g., four ferrule assemblies) may form a spiral path within a ring region about a center point. FIG. 10 illustrates such an embodiment, where the inner most ring region 104 ("ring 104") represents the region in which spiral path 74a taken by a first ferrule assembly 68a for a distance D is defined; the next ring region 106 ("ring 106") represents the region in which the spiral path 74b taken by a second ferrule assembly 68b for a distance D is defined; and the next two ring regions 108, 110 ("ring 108" and "ring 110") correspond to the regions in which the spiral paths 74c, 74d taken by third and fourth ferrule assemblies 68c, 68d, respectively, are defined. Because the distance D and feed rate U remain the same for each ferrule assembly, then from equation (5) it can be seen that the area of each ring is the same. Accordingly, the radial width of each successive ring decreases in a radial outward direction. The rings 104, 106, 108, 110 may be concentrically arranged and be spaced from each other by a small radial gap 102 as shown in FIG. 10. In this regard, before an additional spiral path is initiated, the starting radius may be offset in the radial direction. For a general ring N, the starting radius may be given by $R_{0,N} = R_{1,N-1} + \Delta_s$, where $\Delta_s$ is the radial offset. This value is relatively small in exemplary embodiments.

Although four ferrule assemblies 68a-68d are schematically illustrated in FIG. 10, in other embodiments a different number of ferrule assemblies may be processed by the same abrasive element 72. The number of ferrule assemblies 68 which may be processed by the abrasive element 72 may be primarily determined by the size of the abrasive element. In any event, the use of the spiral path 74 for each of the ferrule assemblies 68 ensures that the area of the abrasive element 72 is being used in an efficient manner.

As discussed above, the trace pattern illustrated in FIG. 10 depicts the serial processing of a plurality of ferrule assemblies 68, each ring representing the spiral path of a single ferrule assembly 68. In an alternate embodiment, the trace pattern illustrated in FIG. 10 may represent different processing steps for the same ferrule assembly 68. Thus, for example, the first ring 104 may be the first processing step for the first ferrule assembly 68a, the second ring 106 may be the second processing step for the first ferrule assembly 68a, and so on until the desired number of processing steps on the same ferrule assembly 68 is completed. Alternatively, and by way of further example, the first and second rings 104, 106 may be part of a two-step processing of the first ferrule assembly 68a, and the third and fourth rings 108, 110 may be part of a two-step processing of the second ferrule assembly 68b, and so on. In embodiments with different processing steps, it should be realized that the input parameters, such as the distance D of abrading engagement, the radial feed rate U, or the speed V of the processing step, may vary between processing steps. Of course, these parameters may also remain the same for each of the processing steps. Moreover, these input parameters may also vary between ferrule assemblies 68 being processed with the abrasive element 72 as described above in reference to FIG. 10. Accordingly, the trace pattern illustrated in FIG. 10 may be representative of a variety of processing protocols for ferrule assemblies 68 using abrasive elements 72.

Figure 7:
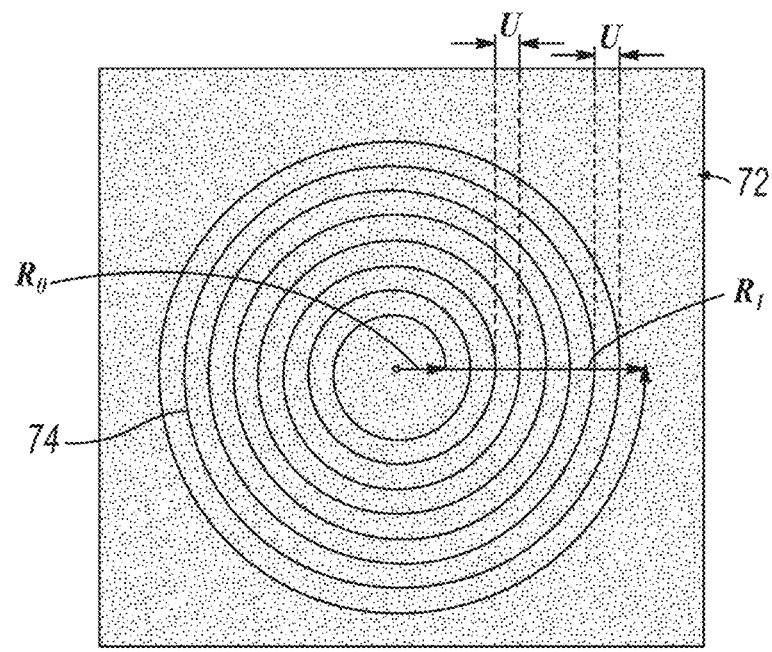
FIG. 7 is a top plan view of an Archimedean spiral traced on an abrasive element in accordance with an embodiment of the disclosure.
Figure 11:
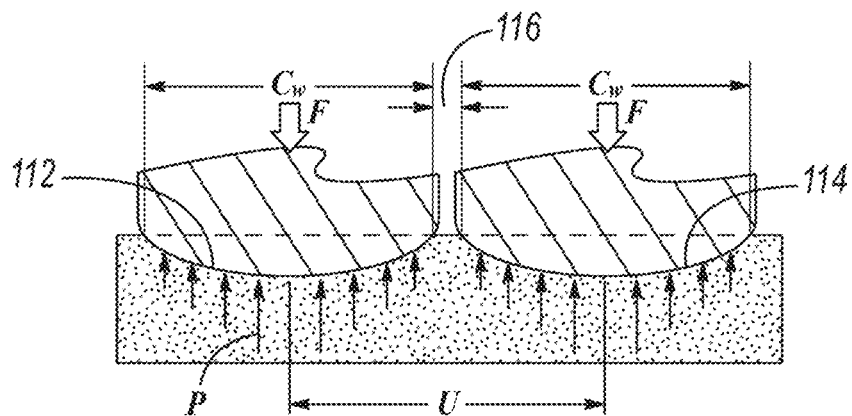
FIG. 11 is a cross-sectional view of successive passes of a spiral path illustrating no overlap region in accordance with an embodiment of the disclosure.

In one embodiment, the processing of the interface 70 of the ferrule assembly 68 may be carried out such that successive passes of the spiral path 74 do not overlap each other. FIG. 11 is a schematic cross-sectional view of the abrasive element 72 showing two successive passes 112, 114 of the spiral path 74. As illustrated in this figure, an engagement force F is applied to one or both of the ferrule assembly 68 and the abrasive element 72 to generate the passes 112, 114 each having a contact width $C_w$ (to simply the figure, the engagement force F is only illustrated as being applied to the ferrule assembly 68). In this embodiment, the radial distance associated with the radial feed rate U is selected to be greater than $C_w$ so as to define a spacing or gap 116 between the successive passes 112, 114 of the spiral path 74 (FIG. 7). To maximize use of the abrasive element 72, however, the gap 116 should be kept to a minimum. For example, the radial distance associated with the radial feed rate U may be between 100% to about 115% of the contact width $C_w$. Thus, in such embodiments, the gap 116 has a radial width that is less than 15% of a radial width of the successive passes 112, 114 of the spiral path 74. These values are exemplary and other values outside of this range may be used.

Figure 12:
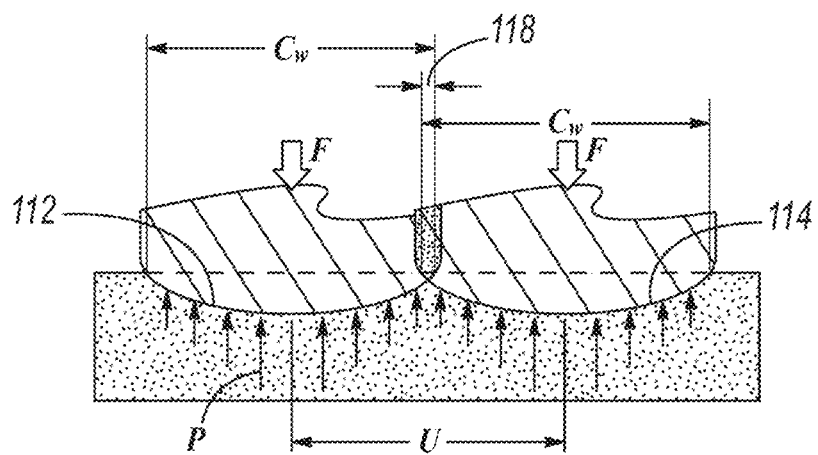
FIG. 12 is a cross-sectional view of successive passes of a spiral path illustrating an overlap region in accordance with an embodiment of the disclosure.
Figure 13:
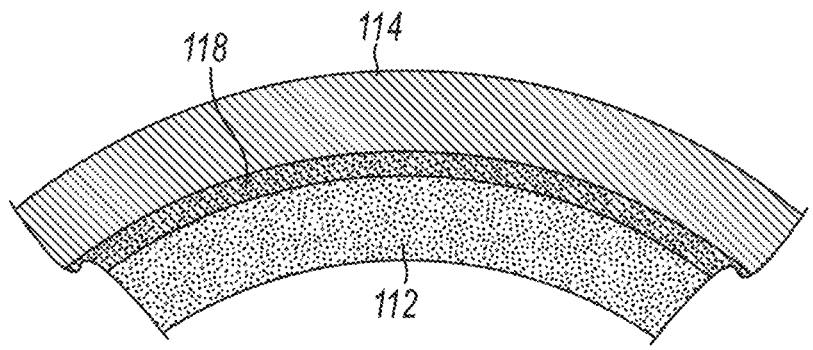
FIG. 13 is a top view of successive passes of a spiral path illustrating a radial overlap region in accordance with an embodiment of the disclosure.

In an alternative embodiment, and as illustrated in FIGS. 12 and 13, the spiral path 74 (FIG. 7) may be configured such that there is some radial overlap between successive passes of the spiral path 74. In this embodiment, the radial distance associated with the radial feed rate U may be less than the contact width $C_w$ of the passes 112, 114, and some portion of the pass 114 passes over a region of the abrasive element 72 that had previously been passed over in the previous pass 112 (e.g., when the spiral is being traversed from inside to outside) to define a radial overlap region 118. To maximize use of the abrasive element 72, the radial overlap region 118 should be maximized without sacrificing the quality of the processing of the interface 70 of the ferrule assembly 68. By way of example and without limitation, the radial distance associated with the radial feed rate U may be between 50% and 100% of the contact width $C_w$, such as between about 55% to 100% of the contact width $C_w$. This, in turn, results in the radial overlap region 118 having a radial width that is less than 50% of a radial width of the passes 112, 114. Stated differently, the radial overlap region 118 has a radial width that is less than 50% of the radial width of successive passes 112, 114 of the spiral path 74.

There are several reasons that justify a spiral arrangement having a radial overlap region 118. First, as illustrated in FIG. 11, a typical pressure distribution P on the abrasive element 72 from the processing operation includes reduced pressure values along the inner and outer boundaries of the contact width $C_w$. Accordingly, the wear that occurs in these areas is reduced compared to the wear occurring in the middle region of the contact width $C_w$. Thus, that region of the abrasive element 72 may have additional useful life and providing an overlap region results in a more efficient use of the abrasive element 72. Second, the most relevant area of the interface 70 of the ferrule assembly 68 is the region immediately adjacent the fiber end 40 (FIG. 5A), which occurs in the middle region of the contact width $C_w$ (e.g., at the apex of the interface 70). Thus, so long as the radial overlap region 118 is sufficiently removed from the region immediately adjacent the optical fiber 16, the overall quality of the processing operation may not be negatively impacted. For this reason, in some embodiments, the radial distance associated with the radial feed rate U may correlate to the diameter of the optical fiber 16. In other embodiments, the radial distance associated with the radial feed rate U may be just slightly greater than 50% (e.g., between about 52% and about 60%) of the diameter of the optical fiber 16. This will ensure that at least the optical fiber 16 will always pass over a "fresh" portion of the abrasive element 72. However, portions of the interface 70 defined by the ferrule 12 (for which precision may be less important) may pass over portions in the radial overlap region 118.

Figure 14:
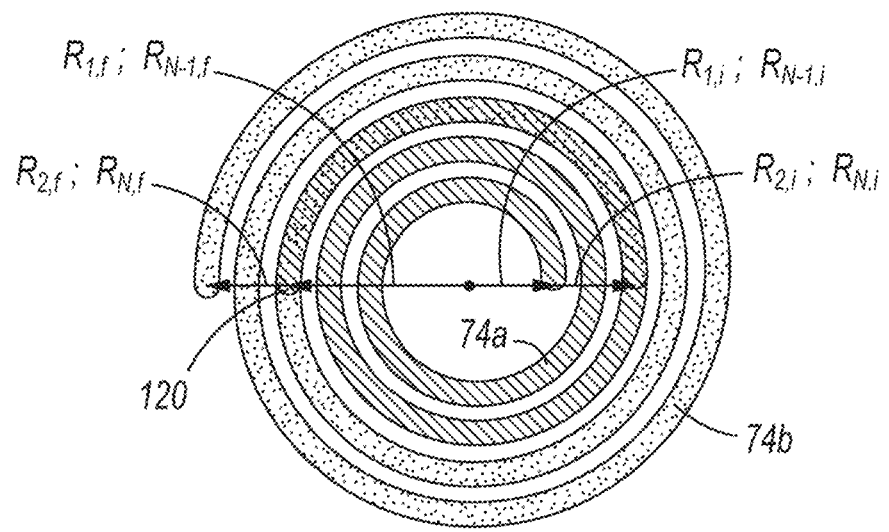
FIG. 14 is a top view of successive passes of a spiral path illustrating a longitudinal overlap region in accordance with an embodiment of the disclosure.

In a further embodiment, the processing of the interface 70 of the ferrule assembly 68 may be carried out such that the spiral paths generated by successive ferrule assemblies (i.e., the spiral path generated by a first ferrule assembly 68a and a second ferrule assembly 68b) or by successive processing steps on the same ferrule assembly 68 provide a longitudinal overlap region. FIG. 14 illustrates the spiral paths 74a, 74b from two successive processing operations (i.e., either by the same ferrule assembly or different ferrule assemblies). The initial radius at which the first spiral path 74a is started is $R_{i,1}$ and the path 74a extends for a distance D to end at $R_{f,1}$. In this embodiment, the starting point for the second spiral path 74b does not start at $R_{f,1}$ or at $R_{f,1}+\Delta_s$ as mentioned above in regard of FIG. 10. Instead, the starting point for the second spiral path 74b moves backward along a portion of the first spiral path 74a to define a longitudinal overlap region 120. The amount of backward movement along the first spiral path 74a may be a percentage P of the abrading distance D. For example, in various embodiments, the amount of backtracking along the first spiral path 74a may be between about 10% and about 50% of the abrading distance D of the second spiral path 74b. These values are merely exemplary and other values are possible. From a processing standpoint, this longitudinal overlap may be generalized. In this regard, turning back to equation (8), the starting position along the spiral path for successive arbitrary spiral paths N and N−1 may be provided by:

$$R_{i,N} = \sqrt{(R_{f,N-1})^2 - \frac{UDP}{\pi}}. \quad (11)$$

where P is the percentage of the distance D to be backtracked along the path of the N−1 spiral. Equation (11) may be programmed into the controller 98 of the apparatus 78 for generating the overlapping spiral paths 74.

The concept behind the longitudinal overlap region 120 for successive spiral paths 74a, 74b is that early stages of material removal is carried out somewhat on a macro scale and high precision in material removal is not necessarily required. For example, removal of the protrusion of the optical fiber 16 beyond the ferrule end face 42 occurs during the early stages of the spiral path 74. Thus, during the early stages, it may be acceptable to traverse the abrasive element 72 along a spiral path that has previously been passed over. However, as processing continues from the macro scale to more the micro scale, increased precision at the interface 70 may be desired. Thus, during the latter stages of material removal, it may be desirable to traverse the spiral path 74 along portions of the abrasive element 72 that are fresh and have not been previously passed over. Accordingly, it is believed that providing a longitudinal overlap 120 does not negatively impact the quality of the processing of the interface 70 of the ferrule assembly 68 so long as the engagement between the ferrule assembly 68 and abrasive element 72 ends along a fresh portion of the spiral path 74. By providing a longitudinal overlap, the abrasive element 74 is utilized in a more efficient manner.

While the radial overlap region 118 (FIG. 13) and the longitudinal overlap region 120 (FIG. 14) were introduced and discussed above as separate concepts, it should be recognized that in various embodiments, these overlap regions 118, 120 may be used alone or in combination with each other. Thus, the processing of one or more ferrule assemblies 68 may include a radial overlap region 118, a longitudinal overlap region 120, or both a radial overlap region 118 and a longitudinal overlap region 120.

Figure 15:
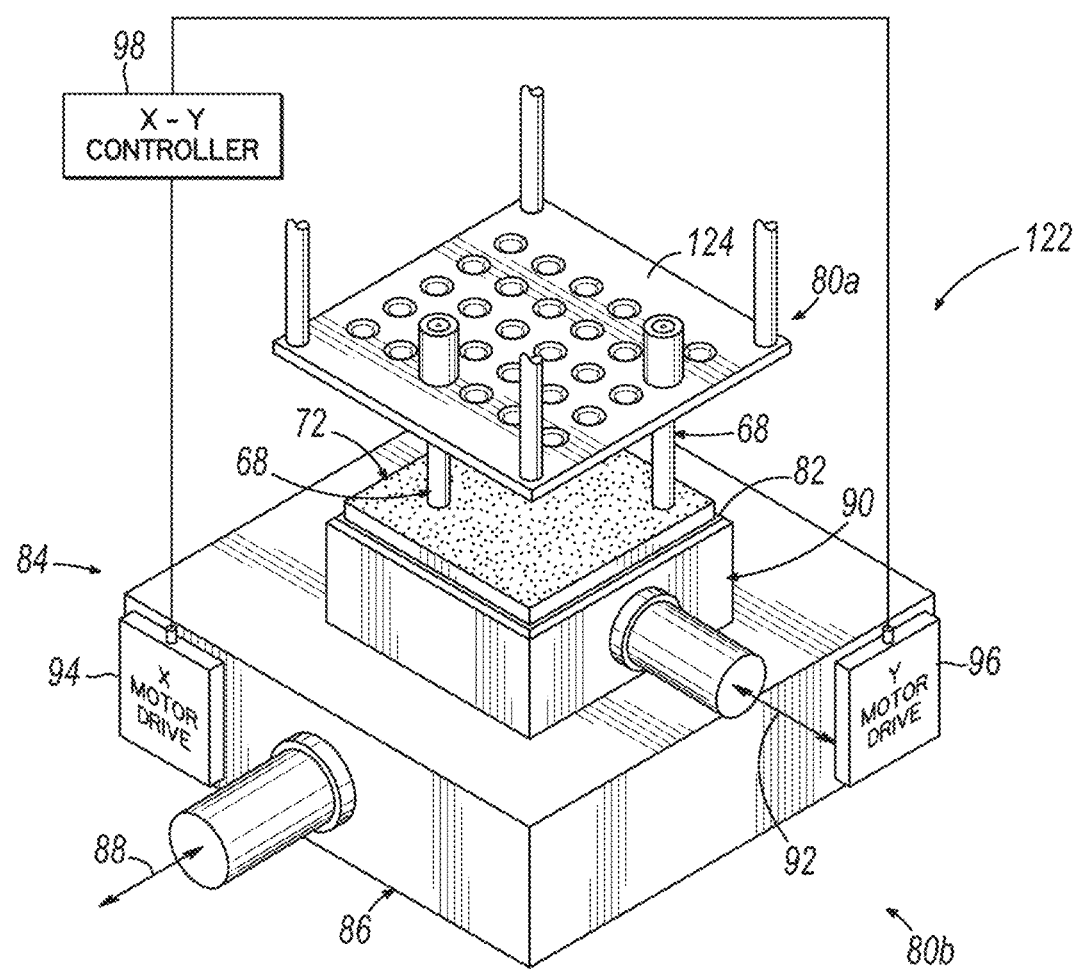
FIG. 15 is a schematic illustration of an apparatus for processing a plurality of ferrule assemblies in accordance with an embodiment of the disclosure.
Figure 16:
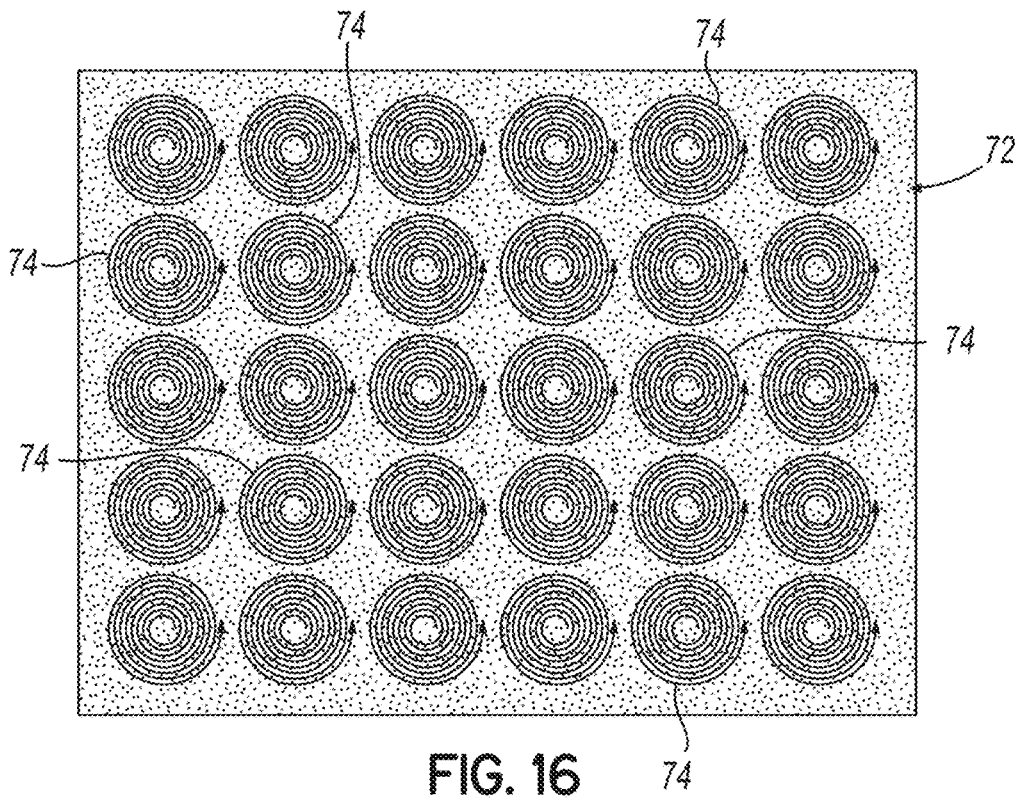
FIG. 16 illustrates a trace pattern on an abrasive element from processing a plurality of ferrule assemblies in accordance with an embodiment of the disclosure.
Figure 17:
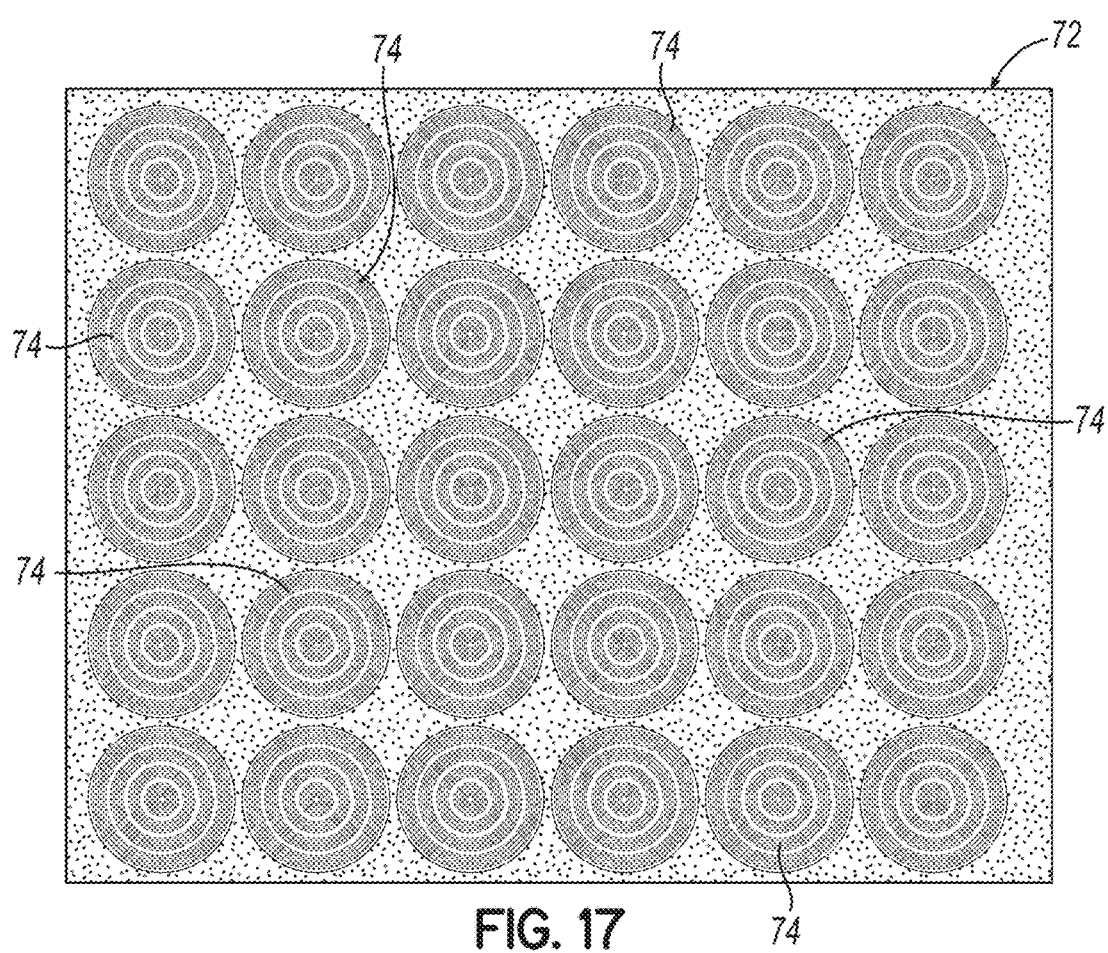
FIG. 17 illustrates a trace pattern on an abrasive element from processing a plurality of ferrule assemblies in accordance with an embodiment of the disclosure.

FIG. 15 illustrates an apparatus 122 similar to apparatus 78 described above with reference to FIG. 8, but which is configured for processing a plurality of ferrule assemblies 68 together in a parallel manner. In this regard, the mount 80a includes a mounting plate 124 for holding a plurality of ferrule assemblies 68. The remaining structure and operation of apparatus 122 remains similar to that described above for apparatus 78. The x and y positions of the abrasive element 72 may be programmed into the controller 98 such that engagement between the ferrule assemblies 68 and the abrasive element 72 traces a spiral path 74 for each of the ferrule assemblies 68 in the mounting plate 124. Such a scenario is illustrated, for example, in FIG. 16. As illustrated in this figure, the spiral paths 74 from the plurality of ferrule assemblies 68 are spaced apart from each other. All the various embodiments discussed above, including the serial processing of ferrule assemblies (e.g., processing batches of ferrule assemblies, with each batch having a plurality of the ferrule assemblies 68), radial overlap regions 118, longitudinal overlap regions 120, etc. equally apply to apparatus 122. For example, FIG. 17 schematically illustrates the trace pattern on the abrasive element 72 resulting from the serial processing of batches of ferrule assemblies or from processing a batch of ferrule assemblies in a multi-step protocol. As illustrated in this figure, for each position on the mounting plate 124 a trace pattern similar to that shown in FIG. 10 may be produced, wherein outer rings may be disposed about inner rings (e.g., concentrically disposed). The plurality of ring trace patterns, however, may be spaced apart from each other, such as in the manner illustrated. Thus, this disclosure is not limited to that explicitly described herein, as those of ordinary skill will understand how to use the various features disclosed herein in various combinations.

As discussed above, in one embodiment, the process (e.g., via the apparatuses 78, 122) may be configured to provide relative movement between the ferrule assembly 68 and the abrasive element 72 at a constant speed V. This may be an input parameter, for example, to the controller 98 to minimize second-order effects (e.g., heat and hydroplaning) in the material removal process, as well as to minimize processing time on the ferrule assembly 68. However, multi-axis machines, e.g., the apparatuses 78, 122 as disclosed herein, have certain limitations relating to the forces required to move the various components in the desired manner. In this regard, the motor drives 94, 96 generate forces sufficient to move the abrasive element 72 to the desired x-y positions. While the actual equation for force to move along a spiral path is complicated, certain simplifying assumptions (similar to the above) may be made based on an order of magnitude analysis. In this regard, a close approximation to the force to move in a spiral may be provided by the mass multiplied by the centripetal acceleration (i.e., basically assuming that the force related to moving in a spiral is the same as the force to move in a circle at the given radius). The centripetal acceleration scales with the inverse of the radius according to:

$$A(r) = \frac{V^2}{r}, \quad (12)$$

where V is the speed at the radius r. Accordingly, for small radii, the forces required to move along the spiral path at a constant speed (as specified in the process above) may be very large. In many cases, the various motors in the apparatus are not capable to providing the necessary force at small radii. Alternatively, at small radii, the system may be subject to significant vibrations that may damage the system or at a minimum negatively impact the processing of the interface 70. One solution is to start the first spiral path at a sufficiently large radius so as to avoid exceeding force and vibration limits. However, an inner region of the spiral then goes unused resulting in an inefficient use of the abrasive element.

Another approach, however, is to remove the constraint of traversing along the spiral path 74 at a constant speed V when at small radii. For example, in another embodiment, it may be desirable to traverse along the spiral path 78 at a constant centripetal acceleration A when at small radii. From a processing perspective, the acceleration analog of equations (8) and (9) need to be developed in order to move the abrasive element 72 in the specified manner. To this end and using equations of motion:

$$A = r\omega^2 = r\left(\frac{d\theta}{dt}\right)^2. \tag{13}$$

By algebraically manipulating this equation and using equation (1), one arrives at the following differential equation:

$$\frac{dr}{dt}\sqrt{r} = \frac{U\sqrt{A}}{2\pi}. \tag{14}$$

A general solution to this differential equation is provided by:

$$r(t) = \frac{1}{4}\left(\frac{6\sqrt{A}}{\pi}Ut + c\right)^{2/3}, \tag{15}$$

where c is an integration constant. Using the condition that at t=0, r=$R_0$ and solving for c, the corresponding radius equation along a spiral for constant acceleration A is provided by:

$$r(t) = \frac{1}{4}\left(\frac{6\sqrt{A}}{\pi}Ut + (4R_0)^{3/2}\right)^{2/3} \tag{16}$$

The angle equation for constant acceleration along the spiral does not change from that stated in equation (9). Thus, equations (16) and (9) represent a system of equations that may be used to generate a spiral in polar coordinates having the following characteristics: (i) a starting position of $R_0$; (ii) an Archimedean spiral having a constant feed rate of U; (iii) movement along the spiral occurs at a constant acceleration of A; and (iv) the spiral ends at $R_1$ at which the total distance travelled along the spiral is D. The polar coordinates may be converted into Cartesian coordinates using equations (10). Based on these Cartesian coordinates, the controller 98 may be configured to activate the motor drives 94, 96 to move the holding plate 92, and thus the abrasive element 72, to locations that correspond to the spiral path 74.

While in one embodiment the entire spiral path 74 may be generated using a substantially constant centripetal acceleration, in an alternative embodiment, a first portion of the spiral path 74 may be generated by traversing the spiral at a substantially constant acceleration while a second portion of the spiral path 74 may be generated by traversing the spiral at a substantially constant speed V. The first portion of the spiral path 74 may be characterized as having relatively low radii while the second portion of the spiral path 74 may be characterized as having larger radii. Indeed, a transition radius $R_t$ may be defined at which point the process changes from traversing along the spiral path 74 at substantially constant acceleration A to traversing along the spiral path 74 at substantially constant speed V. In an exemplary embodiment, the transition radius $R_t$ may be selected when the speed along the constant acceleration spiral path is substantially equal to the constant speed V. In other words, $R_t = V^2/A$. This ensures a smooth transition between the two modes and prevents the speed from exceeding its desired value.

Those skilled in the art will appreciate that other modifications and variations can be made without departing from the spirit or scope of the invention. For example, although the ferrule assemblies 68 are described above as being supported by respective connector bodies (e.g., the connector body in FIG. 2) of fiber optic connectors during the processing, in alternative embodiments the ferrule assemblies may be processed before being assembled together with a respective connector body. Moreover, in some embodiments, the ferrule assemblies may not be intended for use in fiber optic connectors, but instead for other optical components, such as as attenuators, optical couplers, isolators, collimators, filters, switches, wavelength division multiplexing (WDM) modules, etc. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A method of processing at least one ferrule that includes an end face, the method comprising:
engaging the end face of the at least one ferrule and an abrasive element with each other;
moving the at least one ferrule and the abrasive element relative to each other; and
tracing a spiral path in the abrasive element due to the relative movement between the at least one ferrule and the abrasive element;
wherein the tracing further comprises:
tracing a first spiral path in the abrasive element from the processing of the at least one ferrule, the first spiral path being defined in a first ring region on the abrasive element; and
tracing a second spiral path in the abrasive element from the processing of the at least one ferrule, the second spiral path being defined in a second ring region on the abrasive element;
wherein successive passes of the spiral path are separated from each other by a substantially constant radial distance.

2. The method of claim 1, wherein at least one ferrule assembly comprises the at least one ferrule and at least one optical fiber coupled to the at least one ferrule, and further wherein the engaging, moving, and tracing are performed with the at least one ferrule assembly.

3. The method of claim 2, wherein the at least one ferrule assembly is supported by a connector body of a fiber optic connector during the processing.

4. The method of claim 1, wherein moving the at least one ferrule and the abrasive element relative to each other further comprises holding the at least one ferrule stationary while moving the abrasive element relative to the at least one ferrule to trace the spiral path in the abrasive element.

5. The method of claim 1, wherein moving the at least one ferrule and the abrasive element relative to each other further comprises holding the abrasive element stationary while moving the at least one ferrule relative to the abrasive element to trace the spiral path in the abrasive element.

6. The method of claim 1, wherein moving the at least one ferrule and the abrasive element relative to each other further comprises moving both the at least one ferrule and the abrasive element to trace the spiral path in the abrasive element.

7. The method of claim 1, wherein tracing the spiral path in the abrasive element further comprises tracing the spiral path of an Archimedean spiral.

8. A method of processing at least one ferrule that includes an end face, the method comprising:
    engaging the end face of the at least one ferrule and an abrasive element with each other;
    moving the at least one ferrule and the abrasive element relative to each other; and
    tracing a spiral path in the abrasive element due to the relative movement between the at least one ferrule and the abrasive element;
    wherein the tracing further comprises:
        tracing a first spiral path in the abrasive element from the processing of the at least one ferrule, the first spiral path being defined in a first ring region on the abrasive element; and
        tracing a second spiral path in the abrasive element from the processing of the at least one ferrule, the second spiral path being defined in a second ring region on the abrasive element; and
    wherein tracing the spiral path in the abrasive element further comprises tracing the spiral path such that successive passes of the spiral path provide a gap therebetween.

9. A method of processing at least one ferrule that includes an end face, the method comprising:
    engaging the end face of the at least one ferrule and an abrasive element with each other;
    moving the at least one ferrule and the abrasive element relative to each other; and
    tracing a spiral path in the abrasive element due to the relative movement between the at least one ferrule and the abrasive element;
    wherein the tracing further comprises:
        tracing a first spiral path in the abrasive element from the processing of the at least one ferrule, the first spiral path being defined in a first ring region on the abrasive element; and
        tracing a second spiral path in the abrasive element from the processing of the at least one ferrule, the second spiral path being defined in a second ring region on the abrasive element; and
    wherein tracing the spiral path in the abrasive element further comprises tracing the spiral path such that successive passes of the spiral path overlap each other to define a radial overlap region.

10. The method of claim 1, wherein the at least one ferrule assembly comprises a first ferrule and a second ferrule, the method comprising:
    performing the engaging, moving, and tracing with the first ferrule to trace the first spiral path; and
    performing the engaging, moving, and tracing with the second ferrule to trace the second spiral path.

11. The method of claim 1, wherein the at least one ferrule comprises a first ferrule, the first spiral path represents a first processing step of the first ferrule, and the second spiral path represents a second processing step of the first ferrule.

12. The method of claim 1, wherein the tracing of the first and second spiral paths is carried out in parallel.

13. The method of claim 1, wherein the tracing of the first and second spiral paths is carried out in series.

14. The method of claim 1, wherein the second ring region is separated from the first ring region so that there is no overlap therebetween.

15. A method of processing at least one ferrule that includes an end face, the method comprising:
    engaging the end face of the at least one ferrule and an abrasive element with each other;
    moving the at least one ferrule and the abrasive element relative to each other; and
    tracing a spiral path in the abrasive element due to the relative movement between the at least one ferrule and the abrasive element;
    wherein the tracing further comprises:
        tracing a first spiral path in the abrasive element from the processing of the at least one ferrule, the first spiral path being defined in a first ring region on the abrasive element; and
        tracing a second spiral path in the abrasive element from the processing of the at least one ferrule, the second spiral path being defined in a second ring region on the abrasive element; and
    wherein the second ring region is generally disposed about the first ring region.

16. A method of processing at least one ferrule that includes an end face, the method comprising:
    engaging the end face of the at least one ferrule and an abrasive element with each other;
    moving the at least one ferrule and the abrasive element relative to each other; and
    tracing a spiral path in the abrasive element due to the relative movement between the at least one ferrule and the abrasive element;
    wherein the tracing further comprises:
        tracing a first spiral path in the abrasive element from the processing of the at least one ferrule, the first spiral path being defined in a first ring region on the abrasive element; and
        tracing a second spiral path in the abrasive element from the processing of the at least one ferrule, the second spiral path being defined in a second ring region on the abrasive element; and
    wherein tracing the second spiral path further comprises overlapping the first spiral path to define a longitudinal overlap region of the first and second spiral paths.

17. The method of claim 1, wherein the moving comprises moving the at least one ferrule and the abrasive element relative to each other so that the spiral path is traced at a substantially constant speed.

18. The method of claim 1, wherein the moving comprises moving the at least one ferrule and the abrasive element relative to each other so that the spiral path is traced at a substantially constant acceleration.

19. The method of claim 1, wherein the spiral path includes a first spiral path portion and a second spiral path portion, wherein the first spiral path portion is traced by moving the at least one ferrule and the abrasive element relative to each other at a substantially constant acceleration, and wherein the second spiral path portion is traced by moving the at least one ferrule and the abrasive element relative to each other at a substantially constant velocity.

20. The method of claim 1, wherein tracing the spiral path in the abrasive element further comprises tracing the spiral path from a radially inward position toward a radially outward position or tracing the spiral path from a radially outward position toward a radially inward position.

21. The method of claim 8, wherein the gap has a radial width that is less than 15% of a radial width of the successive passes of the spiral path.

22. The method of claim 9, wherein a radial width of the radial overlap region is less than 50% of a radial width of the successive passes of the spiral path.

23. The method of claim 15, wherein the second ring region is separated from the first ring region to define a radial gap therebetween.

24. The method of claim 16, wherein the longitudinal overlap region has a distance that is no more than about 50% of the distance of the second spiral path.

* * * * *